United States Patent [19]
Murray

[11] 3,883,631
[45] May 13, 1975

[54] METHOD AND MEANS FOR MAKING HIGH MOLECULAR WEIGHT POLYETHYLENE SHEETS

[75] Inventor: Coyt E. Murray, Gastonia, N.C.

[73] Assignee: Impact Plastics, Incorporated, Gastonia, N.C.

[22] Filed: Aug. 21, 1969

[21] Appl. No.: 860,145

Related U.S. Application Data

[63] Continuation of Ser. No. 596,932, Nov. 25, 1966, abandoned.

[52] U.S. Cl............ 264/210 R; 264/237; 264/284; 264/294; 264/320; 425/327; 425/343; 425/380
[51] Int. Cl............................................. B29f 3/08
[58] Field of Search ............ 264/176, 40, 120, 210, 264/167, 177, 88, 280, 284, 237, 331, 294, 296, 320; 18/12 M, 12 D, 13 C, 19 F, 35; 425/343, 327, 380

[56] References Cited
UNITED STATES PATENTS

| | | | |
|---|---|---|---|
| 3,039,142 | 6/1962 | Zavasnik | 264/210 |
| 3,239,881 | 3/1966 | Larsen | 264/176 |
| 3,392,224 | 7/1968 | Archer | 264/176 |

*Primary Examiner*—Jeffery R. Thurlow

[57] ABSTRACT

This information relates to the extrusion of high molecular weight polyethylene having a molecular weight in excess of 1,000,000 and to a method and means for altering the cross-sectional dimensions of the extruded sheet.

16 Claims, 11 Drawing Figures

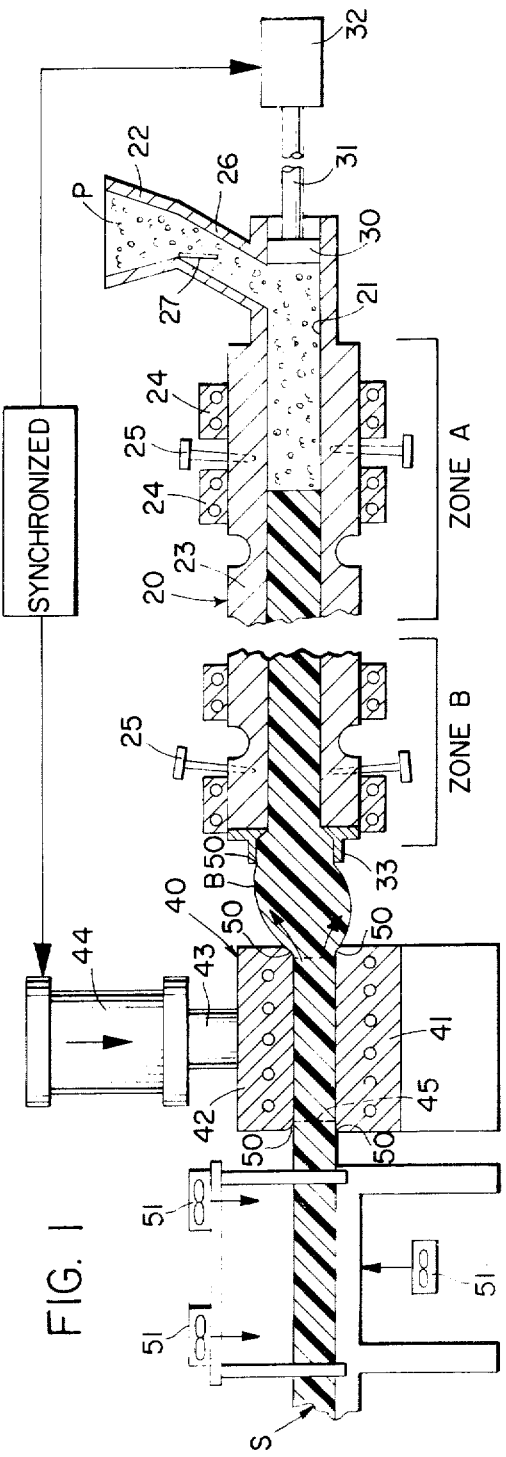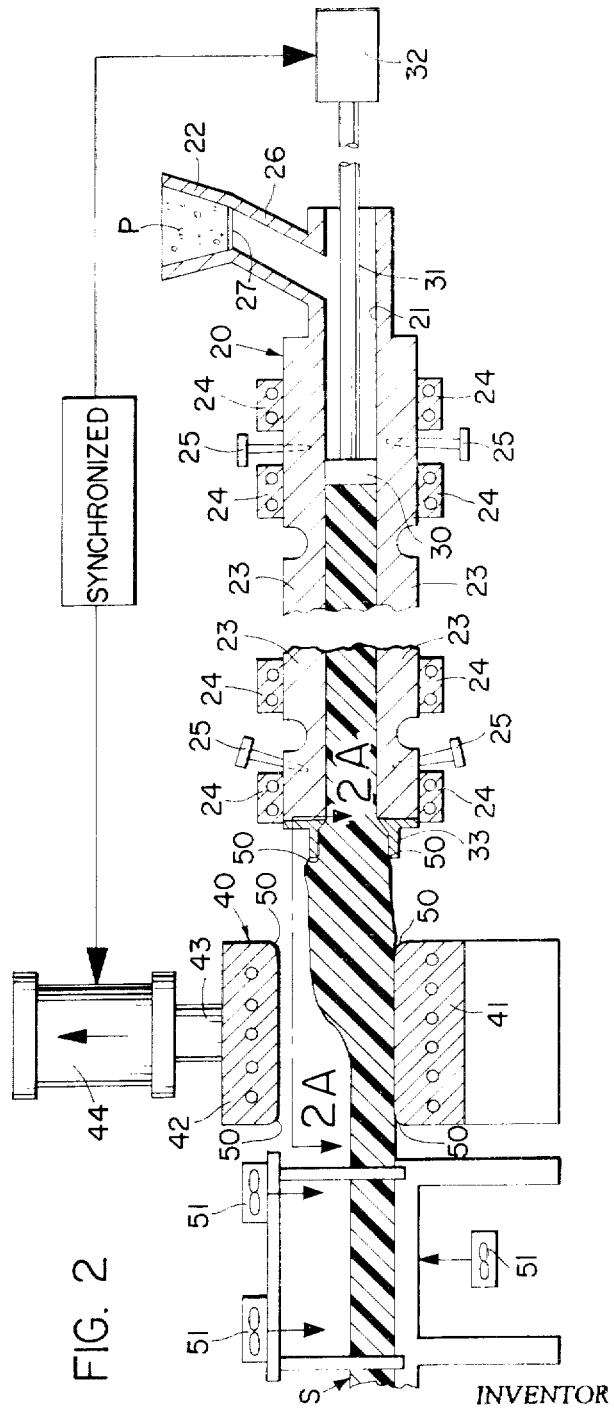
FIG. 1
FIG. 2
INVENTOR
COYT E. MURRAY
BY
ATTORNEY

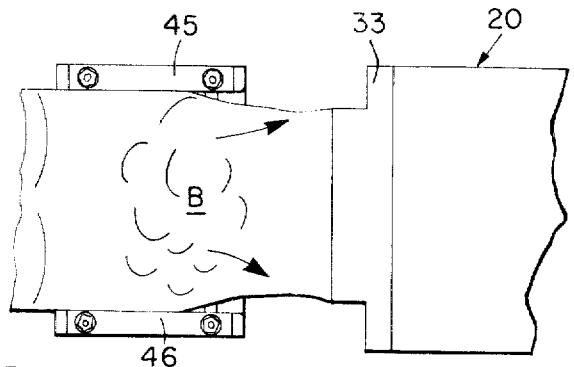
FIG. 2A
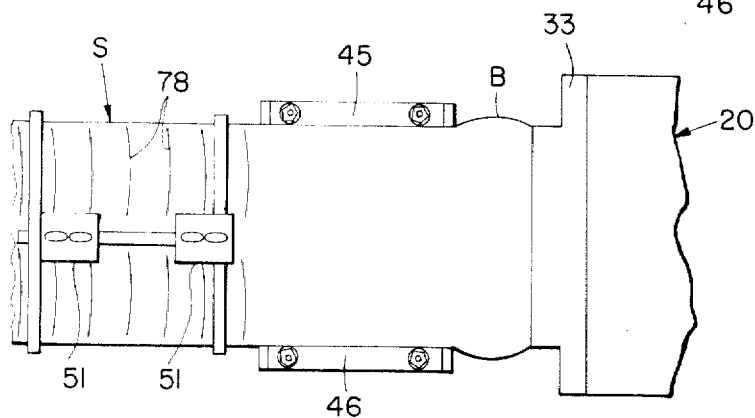
FIG. 3
FIG. 8
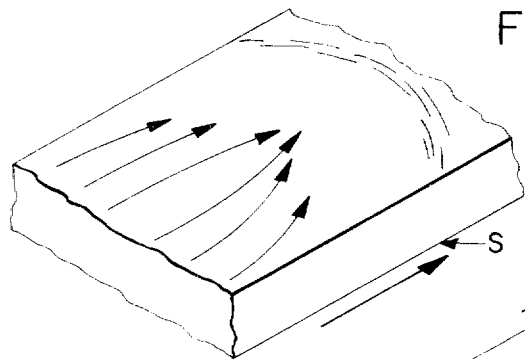
FIG. 10
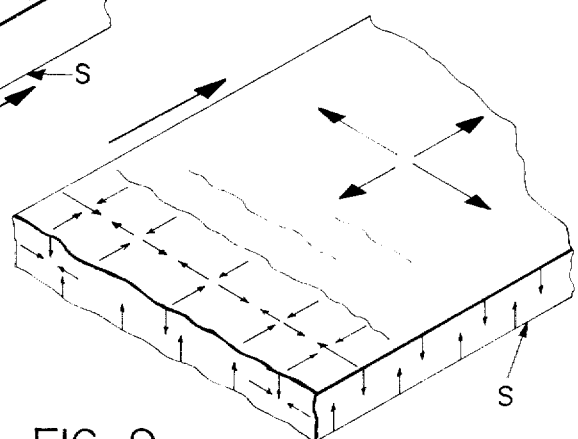
FIG. 9
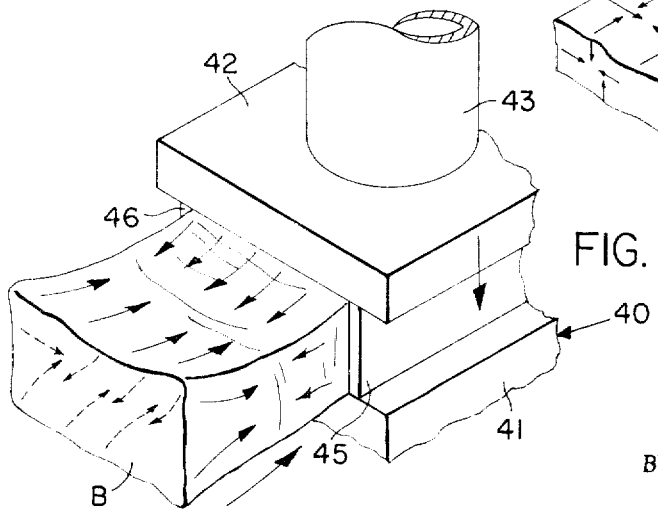
INVENTOR
COYT E. MURRAY
BY
ATTORNEY

INVENTOR
COYT E. MURRAY

BY  *Clifton T. Hunt Jr*

ATTORNEY

METHOD AND MEANS FOR MAKING HIGH MOLECULAR WEIGHT POLYETHYLENE SHEETS

This application is a Continuation of applicant's application Ser. No. 596,932 filed Nov. 25, 1966 and now abandoned.

This invention relates to the manufacture of high molecular weight polyethylene sheets or shapes, and more particularly to an improved method and means for making such sheets or shapes in commercial quantities more efficiently than has heretofore been possible with respect to time, quality of the finished product, and cost.

This invention is not concerned with the formulation of the basic chemical components of high molecular weight polyethylene or with the processing or mixture of these ingredients into the raw material from which the finished high molecular weight polyethylene slab is formed. Rather, the instant invention is concerned with the transformation of the granular or powdered high molecular weight polyethylene resin into a solid or slab form having optimum physical properties of toughness, flexibility, resilience, abrasion resistance, impact strength, and lubricity. As used herein, the term "high molecular weight polyethylene" means polyethylene or other polymer having a molecular weight of approximately 1,000,000 or greater, and having hot melt tensile strength 3 to 6 times greater than that of the usual high density extrusion resins in the molecular weight range of 200,000 to 250,000. By way of further comparison, the usual high density polyethylene extrusion resins in the molecular weight range of up to about 250,000 are about the consistency of molasses and are little more than self-supporting in their amorphous state as they leave the extruder. They can be easily fractured or ruptured in their hot melt or amorphous state by passing a gloved hand through the plastic, the glove being necessary only to protect one from the heat. On the other hand, the polymer resins in the molecular weight range of 1,000,000 to 2,000,000 and above with which this invention is concerned exhibit unusual toughness or hot melt strength in the amorphous state as it comes from the extruder. In fact, it will not fracture or rupture even when struck with a hammer while in an amorphous state.

Prior to this invention high molecular weight polyethylene resin in powdered or granular form was transformed into rectangular panels or cylindrical billets by a process known in the art as compression molding. The transformation of the powdered or granular resin into a solid form was accomplished by coalescing the material under high pressure and heat above its crystalline melting point of 289°F. and gradually cooling the material while maintaining the high pressure for a prolonged period of time. The amount of pressure and the length of time required to transform the granules into a solid state possessing the above optimum physical properties depends on the quantity of material being processed, a larger quantity requiring a longer time at the same high pressure.

As an example of the conventional molding technique of high molecular weight polyethylene, assume it is desired to produce a sheet of high molecular weight polyethylene about two inches thick by the conventional two stage compression molding technique. In the first stage a cold preform is made of the granular raw material, and the second stage comprises melt sintering of the preform. The preform is made by placing the granular raw material into a block form of the desired 2-inch thickness and subjected to pressure of about 1400–2800 psi for 5 to 10 minutes. This results in a preform which with careful hand handling can be taken from the form. Normally, this cold-pressed block is loaded into the mold which is then placed in a press heated to 350° to 400°F. A time of 2 to 3 hours is necessary for the melting of these blocks without defects.

At the beginning of the melting, the block is loaded with a pressure of 300–700 psi on the preformed plastic. After the prescribed heating time of 2 to 3 hours, the block must be cooled for about 1 hour under pressure. During this cooling, a gradual increase of pressure is recommended. A pressure of 2500 psi or more must be attained on the plastic at the end of the cooling, to minimize voids on the interior and sunken spots on the surface of the blocks. Care should be taken so that the sides of the block do not cool faster than the center, and that pressure is uniformly distributed. High molecular weight polyethylene is virtually incompressible in its granular, crystalline, or solid form, and the high pressure is required to increase the density of the finished sheet to give it the desired physical properties.

One difficulty in the transformation of granular high molecular weight polyethylene into a solid state is the maintenance of a uniform pressure on all portions of the slab being processed. It is also important that all portions of the slab being processed be cooled uniformly from the requisite processing temperature above the crystalline melting point of the material to room temperature. Unless the mass of material is cooled at a uniform rate from the inside of the material to its surface the molecular chains become distorted to such an extent that the resulting solid sheet does not possess those physical properties required for satisfactory end use of the high molecular weight polyethylene product. For example, the molded sheet which has been improperly cooled cannot be machined or worked into a satisfactory finished product because of the tendency of the molecular chains to distort the shape of the improperly cooled sheet when cut into relatively thin finished products from the manufactured sheet. An additional disadvantage occasioned by improper cooling of the mass of material is the fact that the distorted molecular chains decrease other desirable physical properties of the high molecular weight polyethylene, such as abrasion resistance and impact strength.

The necessity of carefully controlling the temperature of the mass of high molecular weight polyethylene during its transformation from powdered form to a solid slab has heretofore caused the use of extremely heavy molds capable of exerting the required high pressures and maintaining the desired heat for the necessary length of time to produce a satisfactory slab or shape. Production under such procedures is necessarily slow and costly, but the resulting end products fabricated from the sheets have found acceptance in several industries where the physical properties of high molecular weight polyethylene have proven advantages. These physical properties, which have been briefly noted above, are more fully set forth in a publication of Hercules Powder Company, Incorporated, Wilmington, Del., entitled "HERCULES TECHNICAL DATA, Hi-Fax No. 30; PROPERTIES, USES, and FABRICATION OF THE HI FAX 1900 SERIES; A Very High-Molecular-Weight, High-Density Polyethylene With Unique Shock and Abrasion Resistance".

High molecular weight polyethylene has proven useful in the textile industry, for example, where it has been fashioned into pickers which drive a pound and a half sharpened steel-tipped shuttle back and forth across a loom more than two hundred times a minute. High molecular weight polyethylene has gained a wide acceptance in the paper industry as a material for suction box covers because of its low coefficient of friction. The abrasion resistance of high molecular weight polyethylene lends it to use as wear strips, its adaptability for this use also being enhanced by its low coefficient of friction. The discussion of the end uses of high molecular weight polyethylene is not in any way intended to be exhaustive but merely illustrative and for the purposes of pointing up the advantages of the present invention.

It is emphasized that the desirable physical characteristics of high molecular weight polyethylene are not attainable unless the high molecular weight polyethylene is transformed from powder form to a solid state or slab under carefully controlled conditions of pressure and temperature.

It is therefore an object of this invention to provide a method and means of transforming high molecular weight polyethylene from its granular resin form to a solid state in a continuous process under controlled pressure and temperature and while altering the size and shape of the slab as it comes from the extrusion die. It has been previously known to extrude high molecular weight polyethylene from the granular form to the solid state, but all such previously known extrusions have been of a relatively small size because of the considerable length of time required to uniformly dissipate the heat from a large mass of high molecular weight polyethylene. Also, it was not possible to change the dimensions of prior art extruded shape because any attempt to change dimensions increased internal stresses. As has been explained, the controlled cooling of the high molecular weight polyethylene is an important step in attaining the desired physical properties and the problem of balancing the internal stresses in the amorphous state is complicated during extrusion because the central material adjacent the longitudinal axis of the extruded material tends to travel faster through the barrel of the extruder than the material adjacent the peripheral edges due to the frictional engagement of the periphery of the slab with the inner wall of the barrel of the extruder. This internal "creepage" is not as significant a factor in the compression molding of high molecular weight polymers but it becomes a stronger factor in affecting the quality of the finished product as the size of the shape or sheet increases in extrusion molding.

It is a further object of this invention to provide an improved method and means of extruding high molecular weight polyethylene from its powdered form to a solid state while bi-axially orienting the molecular chains to balance certain internal stresses which otherwise adversely affect the end use of the product.

It is a still further object of this invention to provide an improved extrusion method and means for transforming high molecular weight polyethylene from its powdered or granular form to a solid state wherein novel means are included for making the finished sheet into a variety of cross-sectional shapes and sizes from a single extrusion die. According to the prior art, a separate extruder was required for each change in dimension of the extruded sheet.

It is a more specific object of this invention to provide a novel method for altering the shape of the amorphous plastic material while it is being cooled from a temperature above its crystalline melting point, which improved method comprises the steps of extruding the plastic material under pressure and temperature in excess of the crystalline melting point of the material, and applying intermittent back pressure to the material after it leaves the major extrusion die and before the internal temperature of the plasticized material falls below its crystalline melting point.

It is another object of this invention to provide improved means for relieving internal stresses in extruded plastic material extruded under pressure and heat above the crystalline melting point of the plastic material, which means comprises an in-line press or finishing die spaced beyond the major extrusion die and operable to exert inward pressure on the amorphous plastic material transversely to its path of movement and of sufficient magnitude to force the amorphous material back toward the extrusion die and create a reservoir of material in the space between the extrusion die and the finishing die.

It is another object of this invention to provide a device of the type described wherein the application of pressure to the amorphous plastic transversely to its path of movement is intermittent and in timed relation to the intermittent movement of the plastic along its path of travel from the extruder.

It is another object of this invention to provide a device of the type described wherein second pressure means are employed adjacent the finishing die or in-line press to exert a steady uniform pressure on the amorphous plastic material and increase the back pressure on the extruded material and correspondingly increase the size of the reservoir of amorphous material between the extruder and the in-line press.

Some of the objects of the invention having been stated, other objects will appear to those skilled in the art from the following description when read in conjunction with the accompanying drawings, in which FIG. 1 is a somewhat schematic longitudinal sectional view of an extruder and in-line press or finishing die arranged according to the invention and showing the ram in retracted position with the finishing die in closed position;

FIG. 2 is a view similar to FIG. 1 but showing the ram in its forward position and the finishing die in the raised or open position;

FIG. 2A is a longitudinal sectional view taken substantially along the line 2A—2A in FIG. 2;

FIG. 3 is a plan view looking at the top of the left-hand end of FIG. 1, but omitting the upper portion of the finishing die;

FIG. 8 is a fragmentary perspective view of an extruded sheet as it leaves a prior art extruder illustrating the effect of creepage;

FIG. 9 is a fragmentary perspective view of the reservoir of amorphous material between the extruder and the finishing die in the present invention and illustrating the effect of back pressure on creepage;

FIG. 10 is a fragmentary perspective view of an extruded sheet after it passes beyond the finishing die in the present invention and illustrating how the finishing die counteracts creepage and balances stresses.

Figure 4:
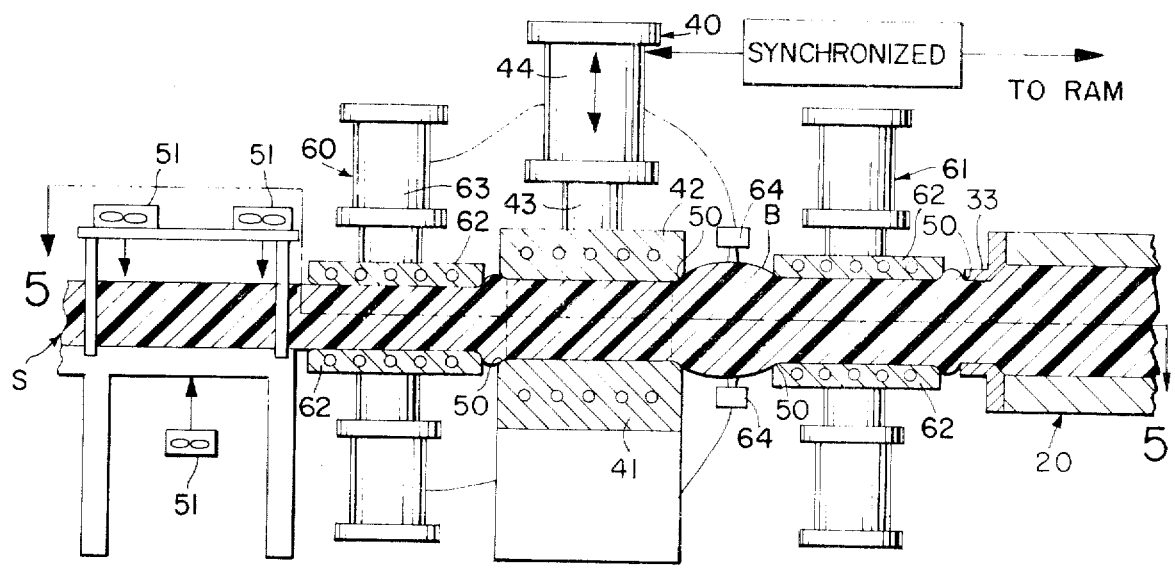
FIG. 4 is a view similar to FIG. 1 but showing a modified form of the invention wherein auxiliary pressure means or brakes are employed adjacent the finishing die.

The drawings show, by way of example, certain embodiments of the invention for continuously producing a high molecular weight polyethylene resin sheet or slab, generally designated S, the sheet being of various desired cross-sectional dimensions, as will more fully appear as the description proceeds.

The extruder, broadly indicated at 20, includes a heated barrel or passage 21 to which a charge of granular high molecular weight polyethylene resin P is fed from a hopper 22. The wall 23 of the extruder 20 is heated as by a plurality of heating elements 24 arranged along the length of the extruder barrel. The temperature of the barrel is carefully controlled by a series of thermocouples 25 which extend into the wall 23. The thermocouples 25 are spaced axially along the extruder so that an accurate control can be kept at all stages.

Any suitable arrangement may be provided for ramming successive increments of the granular raw material P into the inlet end of the passage 21. For example, the hopper 22 may be connected to the passage 21 by a chute 26 and closable by a movable gate 27. Granular material P may be admitted into the chute 26 and thence into the passage 21 when the gate 27 is moved to the open position as shown in FIG. 1.

A suitable ram 30 of the same cross-sectional configuration as the passage 21 is mounted for reciprocal movement into and out of the barrel 21 for the purpose of ramming successive increments of the granular raw material into the passage 21. The ram 30 is actuated by a piston rod 31 extending toward the inlet end of the extruder from a hydraulic cylinder 32.

The pressure exerted on the plastic mass in the heated passage 21 by the ram 30 should be relatively high, preferably above 2500 lbs. psi to avoid the formation of voids and to provide a high density product. A pressure of approximately 4000 lbs. psi has been used successfully, and in fact the amount of pressure that can be successfully used depends only on the equipment available. Since the high molecular weight polyethylene is virtually incompressible, any increase in pressure serves only to improve the desirable physical properties by slightly increasing the density of the finished product.

The barrel of the extruder 20 may be considered as a major die in defining the shape of the finished sheet. To this end it is divided into two thermal zones, A and B. Zone A, adjacent the hopper 22 must be heated well above the crystalline melting point of the resin to insure the heating of the resin well above that temperature. It is also important that the successive charges of resin P be allowed to remain within Zone A of the heated passage 21 long enough to raise the temperature of all the granules in each successive charge well above the crystalline melting point. The rate of production in the continuous extrusion process of the invention depends on the linear dimensions of Zone A (for properly coalescing the material) and Zone B (for properly cooling the material before it leaves the major die), a longer length permitting the material to pass through the extruder more quickly while insuring that each individual granule is desirably heated and cooled in Zones A and B.

The crystalline melting point of high molecular weight polyethylene is about 289°F. and to effect rapid coalescence and economics in production it is desirable to use the maximum possible heat in Zone A. This has been determined to be about 450° to 500°F. because high molecular weight polyethylene is subject to rapid thermal degradation at about 520°F. and above.

As each successive charge of resin P progresses from Zone A to Zone B within the major die it has been transformed from granular form to a molten or amorphous form. Zone B is heated as by electrical units 24 to increasingly lesser temperatures than the temperature in Zone A so that the resin has been cooled to approximately its crystalline melting point and within the range of 270° to 330°F. as it emerges from the outlet end of the major die, or from an altering die 33 at the outlet end of the extruder if an altering die is used for reasons to be described.

The plasticized resin retains sufficient heat to remain in an amorphous state for a few minutes after leaving the extruder and it is the treatment of the material at this critical stage with which the invention is primarily concerned. It is important to the satisfactory practice of the invention that the temperature of the resin be carefully controlled and that it be at a temperature within the range of 270° to 330°F. (300°F. being preferred), as it leaves the extruder. If it is too cold it will "freeze" within the extruder. If it is too hot it will expand too much as it leaves the extruder.

The plasticized resin is forced from the extruder under impetus of the ram 30, which, in the described embodiment of the invention, is arranged to deliver a stroke of about two to four inches on a 1 to 2 minute cycle against the frictional resistance of the raw material P within the passage 21 and beyond. The effective length of the major die will vary depending on its internal dimensions, but assuming these to be 2 × 12 inches, the major die defined by the passage 21 is desirably about 10 feet long. Assuming a ram pressure of 4000 psi and a major die of the above dimensions, an output of 70 to over 100 pounds per hour may be obtained.

A finishing die 40 is spaced outwardly beyond the extruder and the extruded resin is fed while in its amorphous state across the space between the extruder and the finishing die 40. This space may be exposed to the ambient air of room temperature or it may be enclosed within a housing for more accurate temperature control if desired. The spacing between the extruder and the finishing die 40 is not critical except that the finishing die must be sufficiently closely spaced to the altering die or to the major die to keep the plasticized resin from cooling below its crystalline melting point before it reaches the finishing die 40 and the spacing must be great enough to permit a reservoir of material to build up under action of the finishing die, as will be more fully described.

The finishing die 40 includes, in the illustrated embodiment, a stationary lower platen 41 and a vertically reciprocable upper platen 42 operably mounted on a piston 43 connected to a hydraulic cylinder 44. Vertical reciprocation of the piston 43 within the cylinder 44 is synchronized with the horizontally reciprocating stroke of the ram 30 so that the upper platen 42 is raised to the position shown in FIG. 2 when the ram 30 makes its inward stroke. As the ram 30 is withdrawn to the position of FIG. 1, the upper platen 42 is moved downwardly to the closed position of FIG. 1. The tremendous thermal expansion of the heated resin against the walls 23 of the extruder prevents the amorphous material from moving back toward the ram 30 as the ram is withdrawn to the FIG. 1 position.

The sheet S is laterally confined between two transversely spaced spacer elements 45, 46 within the finishing die 40. The spacer elements 45, 46 are adjustably mounted within transverse slots 48 in the stationary lower platen 41 and are spaced from each other a distance equal to the desired width dimension of the finished sheet S. The vertical dimension of the spacers 45, 46 corresponds to the desired thickness dimension of the finished sheet S. In practice, it is convenient to have several sets of spacer elements of varying height corresponding to the range of thicknesses of the sheets to be processed. The sheet S as it enters the finishing die 40 is thicker than the height or vertical dimension of the spacers 45, 46 and narrower than the transverse distance between the spacer elements, assuming it is desired to make the finished sheet wider and thinner than the cross sectional dimensions of the altering die.

The upper platen 42 is movable into engagement with the upper edges of the spacers 45, 46 under pressure of the ram 43. As the platens of the finishing die close and exert pressure on the amorphous resin, a back pressure is exerted on the resin in the direction of the extruder 20 while reducing the thickness of the sheet to the height of the spacers. The back pressure helps enlarge the cross sectional dimension of that portion of the amorphous sheet S lying between the extruder and the finishing die to form a reservoir of amorphous resin indicated at B. The amorphous resin is prevented from re-entering the passage 21 under pressure of the finishing die 40 because of the ram 30 and the thermal expansion of the resin against the wall 23 of the extruder. The resin is cooled to a solid state after passing beyond the finishing die and therefore forms a barrier against forward movement of the amorphous resin away from the extruder under action of the finishing die.

Figure 7:
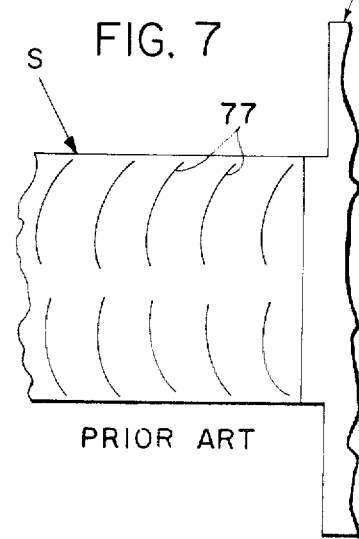
FIG. 7 is a fragmentary schematic plan view of a prior art extruder and the extruded sheet.
Figure 6:
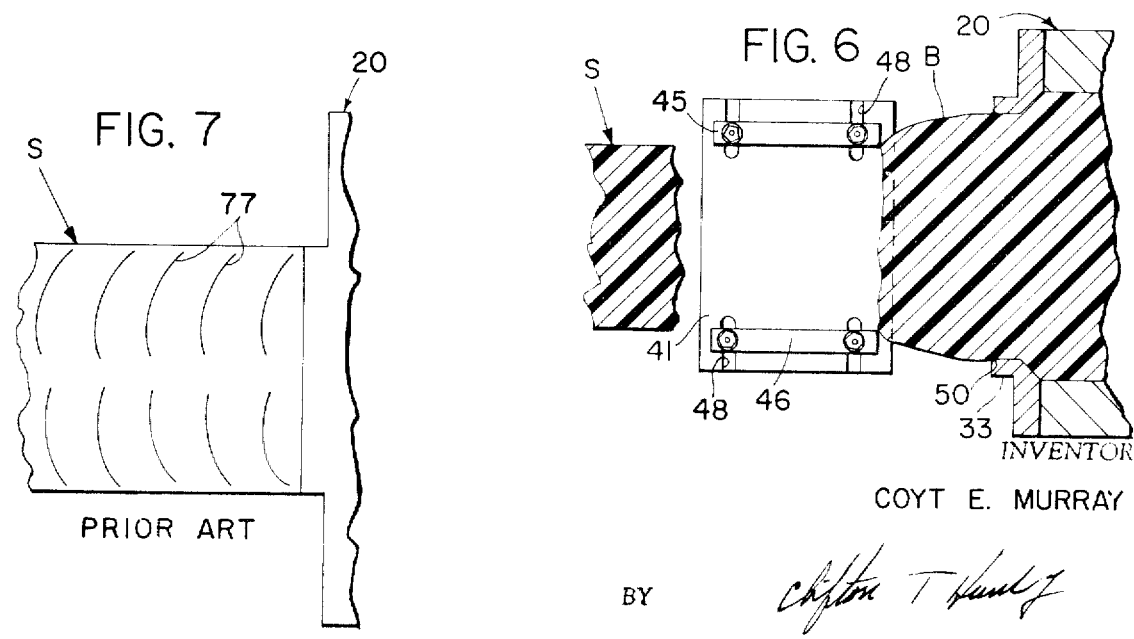
FIG. 6 is an enlarged fragmentary view, with parts broken away, looking down on the upper platen of the finishing die and showing in exaggerated form the extruded sheet being reduced in width after it comes from the extruder.

The back pressure exerted by the finishing die has the effect of reversing the tendency of the elongated molecular chains to bend inwardly toward the axis of the plasticized resin as a result of creepage. This may be more readily understood by reference to FIGS. 8, 9, and 10. The curved arrows on the sheet S in FIG. 8 illustrate the tendency of the molecular chains to move toward the longitudinal axis of the sheet as it is extruded in the direction of the arrow 75. This is caused by creepage. FIG. 9 shows the press or finishing die 40 in the down position and illustrates how the amorphous material flows from the finishing die back toward the reservoir B, thereby equalizing stress movement due to creepage. The hotter, less viscous material in the center moves back into the reservoir faster than the material in the cooler outside edges of the extruded sheet, thereby arresting the creepage. FIG. 10 shows the extruded sheet after it passes beyond the finishing die which exerted compressive force on the sheet while cooling it from its amorphous state to balance the stresses in the finished sheet. The finished sheet has visible marks or lines on the surface caused by creepage and the intermittent extrusion of the sheet. These lines which curve forwardly toward the center when a finishing die is not used to exert back pressure are indicated at 77 in FIG. 7. When the finishing die is used in accordance with the invention, the lines curve rearwardly from the center as shown at 78 in FIG. 5.

The plates or platens 41 and 42 are thermally controlled as by running hot oil or steam through cores 47 in the upper and lower platens. In some instances, it may be desired to cool the platens in which case it would be possible to run a refrigerant through the cores 47. Where it is desired to widen the sheet S about 2 inches more than the width of the extruder the platens 41, 42 are heated to a temperature of about 140° to prevent the outer edges of the plasticized resin from cooling too rapidly and forming a surface skin while the sheet is being shaped in the press. The temperature of the platens is increased as the width of the plasticized resin within the press is increased beyond the width of the passage in the extruder. That is, the greater the increase in width, the higher the temperature of the platens.

The edges of the platens 41 and 42 adjacent the extruder 20 are bevelled as indicated at 50 to facilitate entrance of the plasticized resin sheet into the press from the extruder and, more importantly, to facilitate movement of the plasticized resin sheet back toward the extruder when back pressure is applied by closing the press 40. The edges of the die 33 are also correspondingly bevelled at 50.

The change in the cross-sectional dimension of the plasticized resin sheet is illustrated in FIGS. 1 through 3, where it is assumed that the cross-sectional dimension of the altering die are 2¼ inches by 12 inches and the dimensions of the major die are less. The dimensions of the finished sheet S after leaving the finishing die 40 are 1¾ inches by 14 inches. Assuming a quantity of the finished sheet has passed beyond the die 40 and cooled to a solid state, the successive increments of plasticized resin which emerge from the extruder will be enlarged both vertically and laterally to form the reservoir B when the die 40 is closed as in FIGS. 1 and 3. When the press opens as shown in FIGS. 2 and 2A and the ram 30 makes its forward stroke to force another increment of plasticized resin from the extruder, a new increment enters the open press.

The press 40 closes for a sufficient length of time to move the plasticized resin sheet to the desired cross-sectional dimension and reform the reservoir B by exerting back pressure, after which the press opens in synchronization with the forward movement of the ram 30 to begin a new cycle. Although the press 40 is heated as described above, it nevertheless exerts a cooling effect on the plasticized resin because the press is heated to a lesser temperature than the crystalline melting point of the resin and the resin emerges from the extruder at a temperature above its crystalline melting point.

The resin sheet is allowed to cool while within the reservoir B and the die 40, and controlled cooling of the sheet continues as the sheet is moved forwardly beyond die 40 under successive strokes of the ram 30. This cooling is accomplished by a succession of fans 51 arranged above and below the axis of the sheet to direct ambient air currents against the central portion of the sheet. The lower group of fans are staggered relative to the spacing of the upper group of fans so that the air currents will be directed substantially uniformly against the central portion of the sheet to cool the central portion of the sheet at approximately the same rate as the periphery of the sheet cools in the ambient air thereby further arresting creepage. This complements the back pressure exerted by the press in balancing the internal stresses in the sheet.

Figure 5:
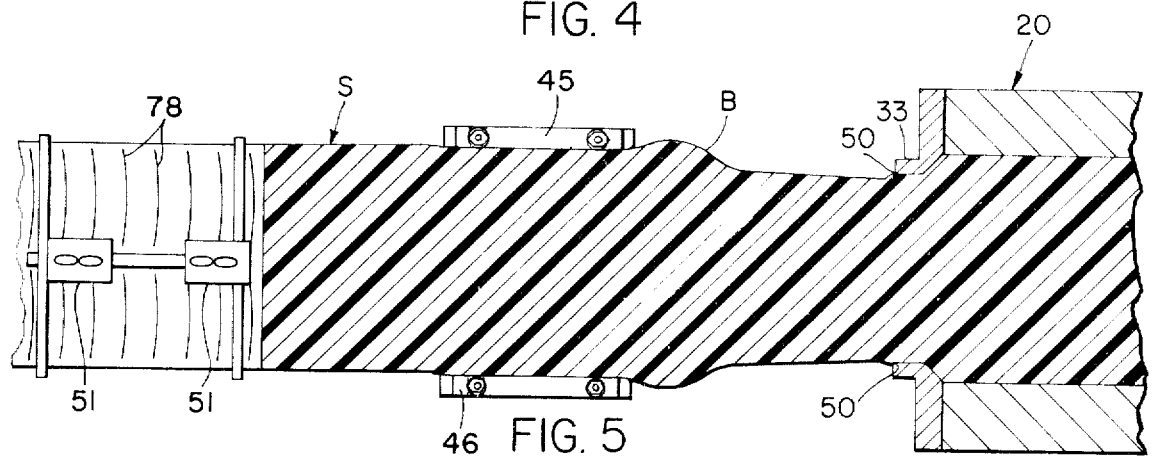
FIG. 5 is a longitudinal section view taken substantially along the line 5—5 in FIG. 4.

The use of auxiliary pressure applying means or brakes broadly indicated at 60 and 61 is illustrated in FIGS. 4 and 5, brake 60 being downstream from finishing die 40 and brake 61 being upstream therefrom adjacent altering die 33. Although both brakes are illustrated, only the downstream brake 60 is used in most instances. The brakes 60 and 61 exert a constant predetermined pressure on the sheet S and are useful when making large changes in the cross-sectional dimensions of the sheet after it emerges from the altering die 33. The brakes 60 and 61 increase the frictional resistance on the periphery of the sheet S thereby causing the back pressure exerted by the finishing die 40 to build a larger reservoir B. The increased size of the reservoir B more effectively reverses the creepage and also provides a greater quantity of material to the press 40 on successive strokes of the ram 30. Consequently, the press 40 is enabled to make larger changes in the cross-sectional dimension of the sheet S. A sensing device may be employed to relieve the pressure on the brake 60 and/or 61 in the event the reservoir becomes undesirably large. Thus, as illustrated in FIG. 4, microswitches 64 may be suitably supported at the outer limits of the reservoir B to be engageable thereby if the reservoir becomes enlarged to that extent. The microswitches are operably connected to the air cylinders 63 to relieve the pressure on the sheet when engaged.

The platens 62 of the brakes may be heated as a further step in controlling the cooling of the plastic material, the need for and amount of heat being determined by the size of the sheet being processed and the extent of the change in dimensions. The platens 62 are normally heated to from 140° to 180°F., but may be operated from room temperature to 220°F.

Air cylinders 63 may be used to exert a predetermined pressure on the brakes. The amount of pressure depends upon the size of the sheet and the extent of the change being made in its dimensions, but in all cases where the brake is used the pressure should be sufficient to exert enough back pressure on the extruded sheet so that the die 33 and the major die defined by the passage 21 are completely filled at all times. An operating pressure of 50 psi has been found to produce satisfactory results in actual practice.

The brake 61 adjacent the extruder may be used without the finishing die to control creepage to a satisfactory extent, depending on the size of the sheet being processed. Its constant pressure on the extruded resin is sufficient to produce a small reservoir of amorphous resin adjacent the extruder as most clearly appears in FIG. 4.

Generally speaking, an altering die such as indicated at 33 need not be used except where it is desired to make a major dimensional change in the sheet after it leaves the major die 21. When used, as in making changes of more than thirty per cent, the altering die puts stress in the amorphous material because any change in direction during extruding increases creepage. The finishing die relieves these stresses through biaxial orientation as explained above.

Assuming the cross-sectional dimensions of the passage 21 in the extruder 20 to be 2¼ inches by 12 inches and assuming this passage to constitute the major die of the extruder, it is possible by the present invention to attach any one of an infinite variety of altering dies 33 to vary the cross-sectional dimension of the finished sheet over a wide range. In actual practice there have been associated with a major die of 2¼ inches by 12 inches different altering dies one of which had inside dimensions of 1¼ inches by 20 inches; another was 1½ inches by 15½ inches; and still another measured 4½ inches thickness by 12 inches in width. The dimensions of the finished sheet can be varied accordingly by simply changing the altering die at the end of the major die and varying the back pressure on the brake.

Even without an altering die the dimensions of the sheet emerging from a major die of, for example, 2¼ inches by 12 inches can be varied a certain amount through the action of the press 40 on the plasticized resin while it is in an amorphous state. Thus, assuming it is desired to produce a finished sheet S having cross-sectional dimensions of 1¾ inches thick by 14 inches wide the spacer elements 45, 46 will be laterally spaced from each other slightly over 14 inches and both spacer elements 45, 46 will extend slightly above one and three quarter inches above the lower plate 41.

There is thus provided an improved method and apparatus for transforming high molecular weight polymers from a granular to a solid state in varying sizes from a single extruder and wherein the resulting product is of superior quality and is produced more economically and in larger volume than has heretofore been possible.

In the drawings and specification, there have been set forth preferred embodiments of the invention, and although specific terms are employed, they are used in a descriptive sense only and not for purposes of limitation, the scope of the invention being defined in the claims.

I claim:

1. A method of transforming high molecular weight polyethylene having a molecular weight of at least 1,000,000 from granular resin to a solid state which comprise:
    a. heating the resin above its crystalline melting point,
    b. moving the heated resin in one direction through an extruder of given cross-sectional internal dimension while confining the resin against radial movement and while cooling the resin to an amorphous state within the extruder,
    c. moving the amorphous resin in said one direction beyond the extruder and across an air space and into a finishing die spaced sufficiently close to the extruder to engage the resin in its amorphous condition and spaced beyond the extruder a distance sufficient to permit formation of a reservoir of resin in the air space between the extruder and the finishing die,
    d. applying inward pressure on the amorphous resin at the finishing die sufficient to exert a back pressure on the amorphous resin in the opposite direction to said one direction and create a reservoir in the space between the finishing die and the extruder of greater cross-sectional dimension than said given dimension.

2. A method of processing high molecular weight polyethylene according to claim 1 which includes the step of relieving the inward pressure at the finishing die while moving the resin in said one direction.

3. Apparatus for extruding high molecular weight polyethylene having a molecular weight in excess of 1,000,000 comprising a major die having an inlet end and an outlet end, a ram reciprocably mounted for movement within the inlet end of the major die, means for introducing successive charges of granular resin into the inlet end of the major die in advance of the retracted ram, a plurality of thermal zones in said major die and spaced axially along its length, means for heating said thermal zones above the crystalline melting point of the resin, means for imparting intermittent inward movement to said ram to move the resin through said thermal zones and out from the outlet end of the major die, and a finishing die for inducing a back pressure of sufficient magnitude on the extruded resin after it leaves the major die to create a reservoir of extruded resin adjoining the outlet end of the major die and of greater cross-sectional dimension than the internal cross-sectional dimension of the major die, said finishing die being spaced beyond the outlet end of said major die a sufficient distance to provide clearance for said reservoir and spaced sufficiently close to the outlet end of said major die to be engageable with the extruded sheet while in its amorphous state, and said finishing die including a platen on opposite sides of the axis of the major die.

4. An apparatus for processing high molecular weight polyethylene according to claim 3 wherein means are provided for imparting reciprocable movement to at least one platen of said finishing die transversely of the axis of the major die in synchronization with axial reciprocation of said ram.

5. Apparatus for processing high molecular weight polyethylene according to claim 3 wherein said finishing die includes means for limiting lateral movement of said extruded sheet under pressure of said platens.

6. Apparatus according to claim 3 wherein the platens of said finishing die are heated above room temperature but below the crystalline melting point of the high molecular weight polymer.

7. Apparatus according to claim 2 wherein second pressure means are positioned adjacent said finishing die, said additional pressure means exerting a constant predetermined pressure on the extruded sheet.

8. Apparatus according to claim 7 which includes sensing means adjacent said reservoir and responsive to an increased size of said reservoir beyond a predetermined point to relieve the pressure on said second pressure actuating means.

9. A method of controlling creepage in the extrusion of high molecular weight polyethylene having a molecular weight in excess of 1,000,000 and having a crystalline melting point of about 289°F, said method comprising steps of heating the resin to over 330°F within the extruder, cooling the resin while in the extruder to a temperature in the range of 270° to 330°F., extruding the resin while at a temperature within the range of 270° to 330°F., and applying pressure on the extruded resin sheet in a direction transverse to its path of travel at a point spaced outwardly beyond the extruder while continuing to cool the extruded resin sheet, the application of pressure being sufficient to create an unconfined reservoir of resin of increased cross-sectional area between the extruder and said outwardly spaced pressure applying means.

10. A method of processing high molecular weight polyethylene according to claim 9 which includes the additional step of altering the cross-sectional dimension of the resin sheet within the extruder while cooling the resin to a temperature within said range of 270° to 330°F.

11. A method of processing high molecular weight polymers according to claim 9 which includes the additional step of changing the cross-sectional dimension of the resin sheet after it leaves the extruder and beyond the reservoir while continuing to cool the resin sheet.

12. A method of processing high molecular weight polyethylene according to claim 10 which includes the additional step of changing the cross-sectional dimension of the resin sheet after it leaves the extruder and beyond the reservoir while continuing to cool the resin sheet.

13. Apparatus for altering the shape of extruded high molecular weight polymers while in an amorphous state following extrusion, said apparatus comprising a finishing die spaced outwardly from the outlet end of an extruder, said finishing die including a platen on opposite sides of the longitudinal axis of the extruded sheet, a spacer element arranged laterally on each side of the axis of the path of travel of the extruded sheet, each spacer element being of a height equal to the desired height of the extruded sheet, and said spacer elements being spaced apart a distance equal to the desired width of the finished sheet.

14. A structure according to claim 13 wherein the height of the spacer elements is less than the corresponding internal dimension of the major die and wherein the distance between the spacer elements is greater than the width of the major die.

15. A structure according to claim 13 wherein the height of the spacer elements is greater than the corresponding dimension of the major die and wherein the distance between the spacer elements is less than the internal width of the major die.

16. A structure according to claim 13 wherein an altering die is interposed between the major die and said finishing die, said altering die having vertical and transverse dimensions falling between the corresponding dimensions of the finishing die and the inside dimensions of the major die.

* * * * *